E. W. M. BAILEY.
DRIVING MECHANISM SUPPORT FOR AUTOMOBILES.
APPLICATION FILED MAY 10, 1907.

913,250.

Patented Feb. 23, 1909.

2 SHEETS—SHEET 1.

E. W. M. BAILEY.
DRIVING MECHANISM SUPPORT FOR AUTOMOBILES.
APPLICATION FILED MAY 10, 1907.
913,250.
Patented Feb. 23, 1909.
2 SHEETS—SHEET 2.
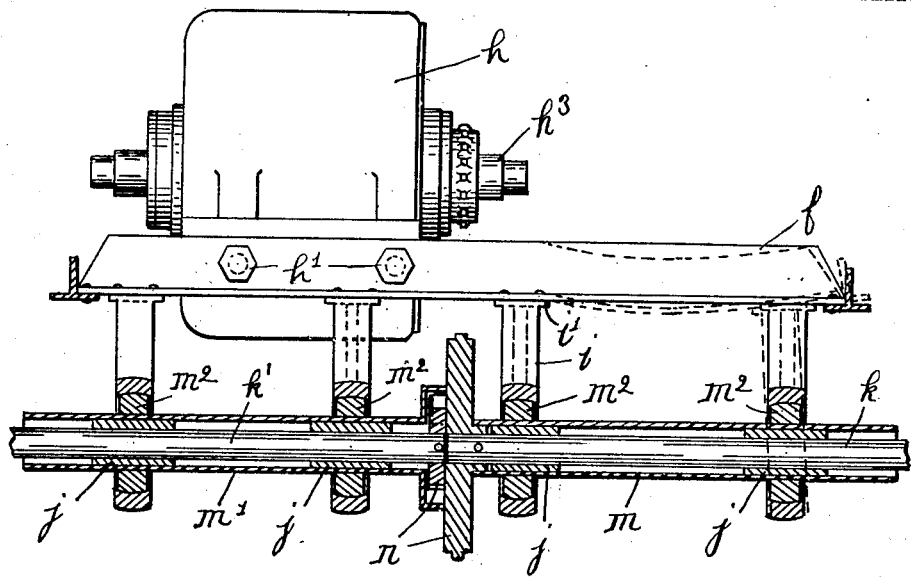
Fig. 4.
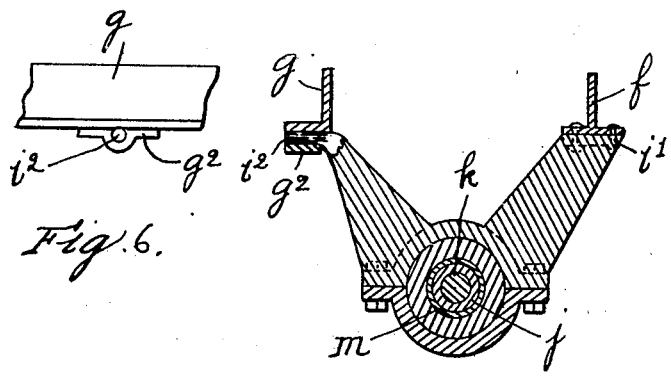
Fig. 6.
Fig. 5.
Witnesses:
H. B. Davis
Cynthia Doyle
Inventor:
Edwin W. M. Bailey
by Noyes & Hanniman
Attys

UNITED STATES PATENT OFFICE.

EDWIN W. M. BAILEY, OF AMESBURY, MASSACHUSETTS.

DRIVING-MECHANISM SUPPORT FOR AUTOMOBILES.

No. 913,250.  Specification of Letters Patent.  Patented Feb. 23, 1909.

Application filed May 10, 1907. Serial No. 372,866.

*To all whom it may concern:*

Be it known that I, EDWIN W. M. BAILEY, of Amesbury, county of Essex, State of Massachusetts, have invented an Improvement in Driving-Mechanism Supports for Automobiles, of which the following description, in connection with the accompanying drawings, is a specification, like characters on the drawings representing like parts.

It frequently happens in the ordinary use of an automobile that the wheels are supported at different levels so that the weight of the machine is borne to an excessive extent on one wheel, or an excessive strain comes on one portion of the frame which tends to twist or bend it. As a result of experience I am led to believe that it is impracticable to make the frame of an automobile unyielding, or practically so, and I believe it to be preferable so to construct the frame that it may yield to an extent to excessive strains, rather than to attempt to make it so rigid that it will be unyielding under all conditions. If the frame yields, however, it is likely to cause the driving mechanism to bind or to throw it out of alinement to a sufficient extent to cause excessive loss of power by friction.

Figure 1:
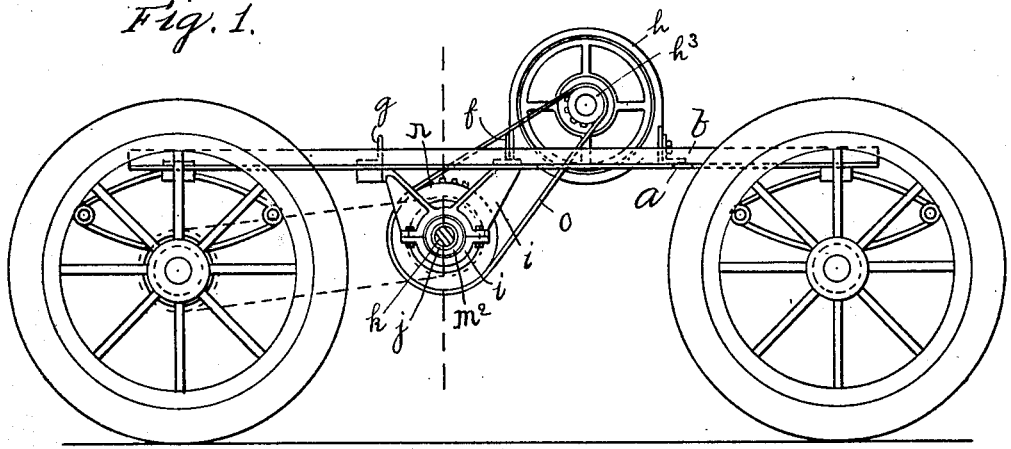
Figure 2:
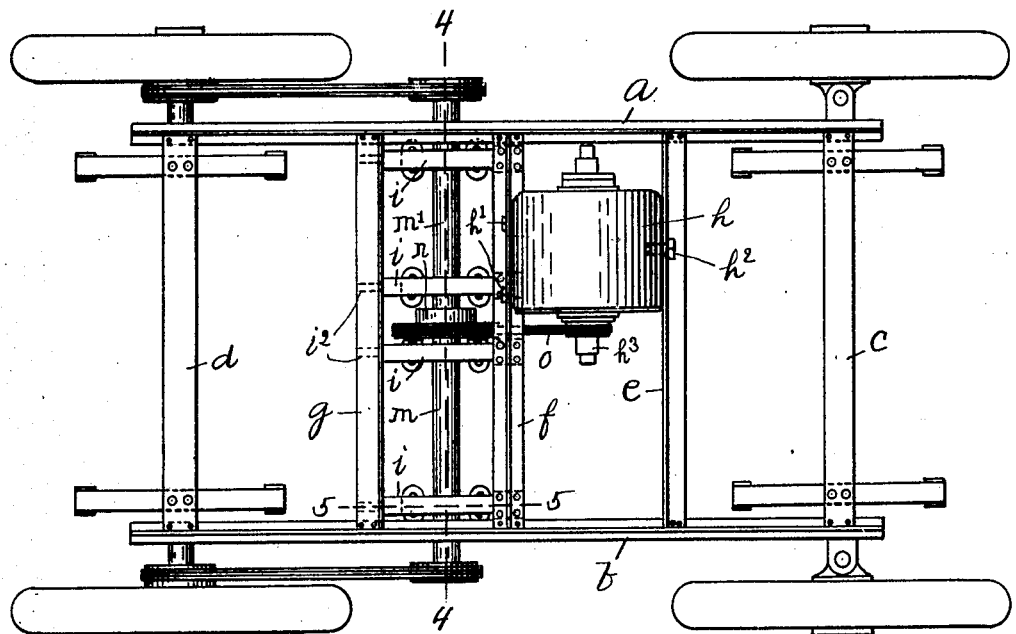
Figure 3:
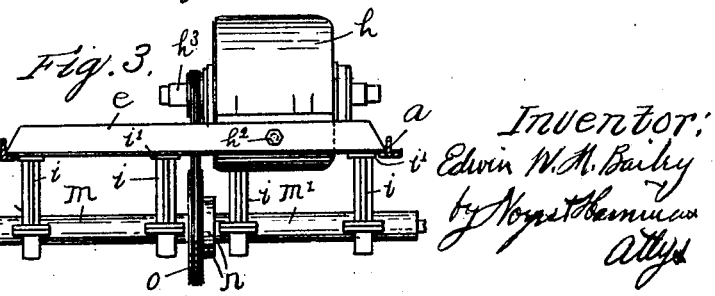

The object of my invention is to provide a form of frame and supporting means for the driving mechanism, whereby yielding of the frame will not cause appreciable binding of the driving mechanism, or in which the binding effect on the driving mechanism, due to yielding of the frame, will be minimized. I accomplish this object by the means shown in the accompanying drawing, in which, Figure 1 is a side elevation of an automobile frame and its driving mechanism made according to my invention. Fig. 2 is a plan view thereof. Fig. 3 is a detail end view of a portion of the driving mechanism. Fig. 4 is an enlarged section on the line 4—4 of Fig. 2. Fig. 5 is an enlarged section on the line 5—5 of Fig. 2. Fig. 6 is a detail view of one end of one of the hangers.

The motor frame comprises the side bars or supports $a$ and $b$, a pair of end cross bars $c$ and $d$ and a series of intermediate cross bars, three cross bars $e$, $f$ and $g$ being shown, said cross bars being securely fastened at their ends to the side bars $a$ and $b$. The middle bar $f$ is preferably somewhat stiffer and stronger than the other bars for reasons which will hereafter appear.

The motor frame $h$ is supported between the cross bars $e$ and $f$, and is rigidly connected to the bar $f$ by means of two or more bolts $h'$ and pivotally connected to the bar $e$ by a pivot bolt $h^2$. A series of shaft hangers $i$ are provided, four in number being shown, which depend beneath the plane of the cross bars $e$, $f$ and $g$, said hangers $i$ each having a broad flat base $i'$ at their rear ends, which are rigidly bolted to the middle bar $f$, and having a pivot $i^2$ at their front ends, which are mounted to swing in clips $g^2$ secured to the under side of the cross bar $g$, as shown in Figs. 5 and 6.

The driving shafts $k$ and $k'$ are mounted in bearings $j$, arranged within tubular casings $m$, $m'$, said shafts $k$, $k'$ being connected with the usual differential gear $n$, which is driven by a chain $o$ from the shaft $k^3$ of the motor. A series of spherical faced collars $m^2$ are securely mounted on the outer surface of the casings $m$, $m'$, the surface of each of said collars having its center in the axis of the shafts $k$, $k'$, and also in the middle plane of one of said hangers $i$, one of said collars being provided for each hanger, and the sections of said hangers being clamped about said collars respectively, so that the driving shafts are firmly supported, while at the same time relative sidewise inclination of the hangers is possible.

With the above described construction, a rigid connection is thus provided between the cross bar $f$ and the motor frame $h$, and also between said bar $f$ and the hangers $i$, while a pivotal connection is provided between each hanger and the cross bar $g$ and between the motor frame $h$ and the cross bar $e$. Bar $f$ is preferably made much heavier than other parts of the frame so that it may act to prevent the motor shaft and driving shaft from being moved out of alinement, and furthermore, certain distortions or bendings either of the cross bar $e$ or cross bar $g$, will not be communicated to the cross bar $f$, or to the hangers $i$, to the same extent as if rigid connections were provided between said cross bars $e$ and $g$ and the middle bar $f$.

The spherical collars $m^2$ between the hangers $i$ and the tubular casing $m$ is advantageous, in that the bending of the middle cross bar $f$ in certain ways, as for example into the dotted position in Fig. 4, in which the end hanger is tipped sidewise to an extent sufficient to cause the shaft in its casing to become bound in its bearings, simply causes the hanger to tip on the collars $m^2$ without causing any binding action on the parts which they support. A certain freedom of motion is thus provided between the casing $m$ and the cross bar $f$, which prevents certain strains, to which the bar $f$ may be subjected, from being communicated to the shaft $k$.

Having thus described my invention, what I claim as new and desire to secure by Letters Patent is:—

1. In an automobile, a frame comprising side supports and a series of connecting cross bars, a shaft hanger having a rigid connection with one cross bar and a pivotal connection with another cross bar, substantially as described.

2. An automobile frame comprising side supports and a series of connecting cross bars composed of an intermediate bar, and a bar adjacent each side thereof, a series of brackets rigidly connected to said intermediate bar and yieldingly connected to one of said adjacent bars, a motor having its frame rigidly connected to said intermediate bar and yieldingly connected to the other adjacent bar, and a shaft journaled in said brackets in parallel with the shaft of the motor and having a driving connection therewith, substantially as described.

3. An automobile frame comprising side supports and a series of connecting cross bars composed of an intermediate bar, and a bar adjacent each side thereof, a series of brackets rigidly connected to said intermediate bar and pivotally connected to one of said adjacent bars, a motor having its frame rigidly connected to said intermediate bar and pivotally connected to the other adjacent bar, the pivots of said brackets and said frame extending in the direction of said side supports, and a shaft journaled in said brackets in parallel with the shaft of the motor and having a driving connection therewith, substantially as described.

In testimony whereof, I have signed my name to this specification, in the presence of two subscribing witnesses.

EDWIN W. M. BAILEY.

Witnesses:
L. H. HARRIMAN,
H. B. DAVIS.